United States Patent
Griffioen et al.

(10) Patent No.: US 8,118,282 B2
(45) Date of Patent: Feb. 21, 2012

(54) METHOD AND DEVICE FOR INSTALLING CABLE INTO CABLE GUIDE TUBING

(75) Inventors: Willem Griffioen, Ter Aar (NL); Willem Greven, Delfzijl (NL); Thomas Pothof, Holwierde (NL); Patrick Menno Versteeg, Katwijk Aan Zea (NL); Cornelis Van T Hul, Den Hoom (NL); Arie Van Wingerden, Hendrik Ido Ambacht (NL)

(73) Assignee: Draka Comteq, B.V., Amsterdam (NL)

( * ) Notice: Subject to any disclaimer, the term of this patent is extended or adjusted under 35 U.S.C. 154(b) by 1126 days.

(21) Appl. No.: 11/944,185

(22) Filed: Nov. 21, 2007

(65) Prior Publication Data

US 2008/0135818 A1   Jun. 12, 2008

(30) Foreign Application Priority Data

Nov. 22, 2006   (NL) .................................. 1032917

(51) Int. Cl.
*B65H 59/00* (2006.01)
*H02G 1/08* (2006.01)
*E21C 29/16* (2006.01)
*B23P 19/04* (2006.01)
*G02B 6/44* (2006.01)

(52) U.S. Cl. ..... 254/134.4; 254/134.3 FT; 254/134.3 R; 29/433; 385/100

(58) Field of Classification Search ................ 254/134.4, 254/134.3 FT, 134.3 R; 29/433, 241, 819, 29/821; 385/100, 103, 134
See application file for complete search history.

(56) References Cited

U.S. PATENT DOCUMENTS

| | | | | |
|---|---|---|---|---|
| 3,034,766 | A | * | 5/1962 | Hamrick .................... 254/134.4 |
| 4,934,662 | A |   | 6/1990 | Griffioen et al. |
| 5,058,259 | A | * | 10/1991 | Araki et al. ..................... 29/433 |
| 5,245,740 | A | * | 9/1993 | Araki et al. ..................... 29/433 |
| 5,503,370 | A | * | 4/1996 | Newman et al. ...... 254/134.3 FT |
| 5,599,004 | A | * | 2/1997 | Newman et al. ...... 254/134.3 FT |
| 5,699,996 | A |   | 12/1997 | Boyle et al. |
| 5,946,788 | A |   | 9/1999 | Griffioen et al. |
| 5,950,298 | A |   | 9/1999 | Griffioen et al. |
| 6,179,269 | B1 |   | 1/2001 | Kobylinski |

(Continued)

FOREIGN PATENT DOCUMENTS

EP   0292037   11/1988

(Continued)

OTHER PUBLICATIONS

European Search Report and Written Opinion in counterpart European Application No. 07022550, dated Apr. 16, 2009 [All references previously cited].

(Continued)

*Primary Examiner* — Lee D Wilson
*Assistant Examiner* — Alvin Grant
(74) *Attorney, Agent, or Firm* — Summa, Addition & Ashe, P.A.

(57) ABSTRACT

Disclosed is an improved method and apparatus for installing a cable into cable guide tubing and the like. The method typically includes rotating a reel of cable guide tubing at least 360° while, using compressed gas, feeding a cable, such as a plurality of microducts, into the cable guide tubing. The related apparatus includes a cable injection unit and a rotation coupling unit to facilitate the installation of cable (e.g., microducts) into the rotating cable guide tubing.

9 Claims, 1 Drawing Sheet

U.S. PATENT DOCUMENTS

| | | | |
|---|---|---|---|
| 6,264,170 B1 * | 7/2001 | Casella | 254/134.4 |
| 6,561,488 B1 * | 5/2003 | Walker | 254/134.4 |
| 6,912,347 B2 * | 6/2005 | Rossi et al. | 385/112 |
| 7,152,685 B2 * | 12/2006 | Adnan et al. | 166/380 |
| 7,574,095 B2 | 8/2009 | Lock et al. | |
| 2007/0263960 A1 | 11/2007 | Lock et al. | |
| 2008/0135818 A1 | 6/2008 | Griffioen et al. | |
| 2008/0317410 A1 | 12/2008 | Griffioen et al. | |

FOREIGN PATENT DOCUMENTS

| | | |
|---|---|---|
| EP | 0296860 A1 | 12/1988 |
| EP | 1927874 A2 | 6/2008 |
| WO | 98/26320 A1 | 6/1998 |

OTHER PUBLICATIONS

Griffioen et al., "Preferrulized Cables for Blowing to Homes through 4/3 mm Microducts," Draka Comteq Cable Solutions, Gouda, Netherlands.

Dutch Search Report and Written Opinion in corresponding Dutch Application No. NL 1032917, dated Mar. 16, 2007.

* cited by examiner

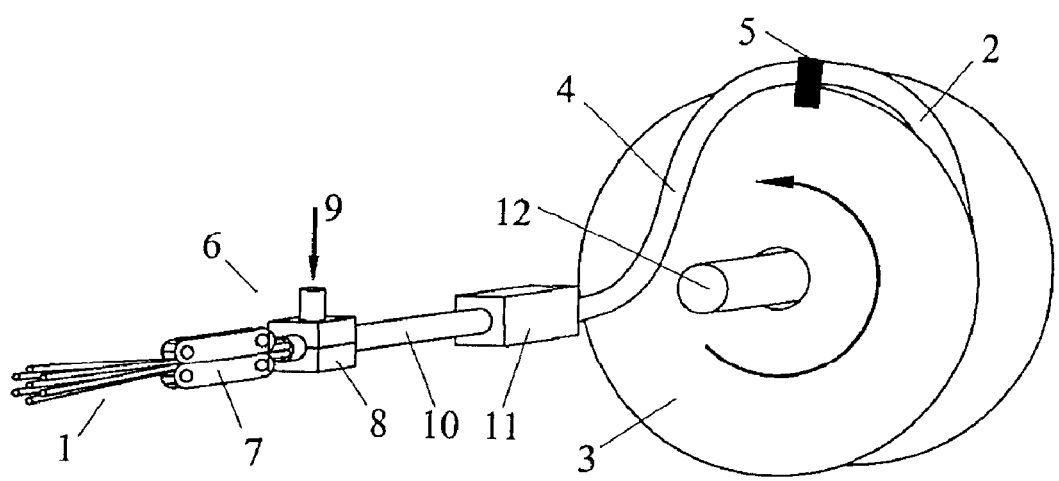

METHOD AND DEVICE FOR INSTALLING CABLE INTO CABLE GUIDE TUBING

CROSS-REFERENCE TO PRIORITY APPLICATION

This application claims the benefit of pending Dutch Application No. 1032917 (filed Nov. 22, 2006, at the Netherlands Industrial Patent Office), which is hereby incorporated by reference in its entirety.

FIELD OF THE INVENTION

The present invention relates to an improved method and apparatus for installing or otherwise inserting a cable (e.g., microducts) into cable guide tubing (i.e., duct).

BACKGROUND OF THE INVENTION

Various methods for installing cables into tubes are known.

For example, European Patent No. EP 0,292,037 (and its counterpart U.S. Pat. No. 4,934,662), recognize that compressed air flow passed through a duct exerts a drag force on a cable being introduced into the duct, thereby pulling the cable through the duct towards the duct outlet. U.S. Pat. No. 4,934,662 is hereby incorporated by reference in its entirety.

U.S. Pat. No. 5,946,788 discloses a method for inserting a cable into tubular sheathing that is wound on a reel. The reel is subjected to a periodic movement having a vertical component and a longitudinal component upon introduction of the cable into the tubular sheathing. The vertical component comprises a vertical oscillation, which is alternately directed upwards and downwards (i.e., opposite to and in the direction of gravity). The longitudinal component may be regarded as an oscillating rotation. It is assumed that the cable is not in frictional contact with the tubular sheathing during free-fall movement of the reel and is thus capable of moving forward within the tubular sheathing without friction. U.S. Pat. No. 5,946,788, however, discloses an exemplary oscillation angle of only about 6° for the longitudinal component. U.S. Pat. No. 5,946,788 is hereby incorporated by reference in its entirety.

International Application No. WO 98/26320 (and its counterpart U.S. Pat. No. 5,950,298) disclose a method for inserting a cable into a tube wound on a reel. The tube reel is subject to a vertical movement during cable insertion. U.S. Pat. No. 5,950,298 is hereby incorporated by reference in its entirety.

U.S. Pat. No. 6,179,269 discloses a method and a device for installing a cable into coiled tubing. The introduction of the cable is carried out by employing a so-called compression station and a tension station. The compression station exerts a compressive force on the cable to urge the cable into the tubing. The tension station is disposed at the end of the tubing for pulling the cable out of the tubing. Such an installation is only suitable, however, for installing cables that can be subjected to a high pulling force. U.S. Pat. No. 6,179,269 is hereby incorporated by reference in its entirety.

These methods notwithstanding, there continues to be a need for an improved apparatus and method for inserting cabling (e.g., microducts) into cable guide tubing, especially prefabricated duct that is wound on a reel.

SUMMARY OF THE INVENTION

The present inventors have found that the use of compressed air (or other blowing technology) for installing a cable into a prefabricated duct is susceptible to a number of problems. For example, when a large number of cables (e.g., microducts) are to be simultaneously installed into a duct (e.g., at a high filling grade), there is a reasonable chance that the cables will be blown into the duct in varying lengths, especially if the duct includes several bends. For example, it has been observed blowing numerous microducts into cable guide tubing can result in the outermost microducts having greater installed length than the innermost microducts.

Undesirable cable tensions often exist when cables (e.g., microducts) of different lengths are present in the same duct. It has been found, for instance, that if the duct needs to be opened at a particular location (e.g., making a connection to another cable), those cables that have greater length tend to protrude from the opened duct. This not only makes completing the connection more difficult but also can cause cable damage. Furthermore, blowing cables into a duct in mutually different lengths leads to increased friction between the various cables. This, of course, causes installation in the duct to become more difficult and, thus, less installation length can be achieved.

Accordingly, it is an object of the present invention to provide a method and device for installing a cable into cable guide tubing such that the cables can be installed over great lengths within the cable guide tubing without subjecting the cables to high tensions.

It is another object of the present invention to provide a method and a device for installing a cable into cable guide tubing such that the cables do not protrude from openings in the cable guide tubing.

It is yet another object of the present invention to provide a cost-effective method and apparatus for inserting a plurality of microducts into a wound, prefabricated duct. It is a related object of the present invention to provide a method that eliminates the need to extrude duct around a plurality of microducts or other cabling.

The present invention achieves this by inserting (i.e., blowing) cable into rotating cable guide tubing (e.g., prefabricated duct that is wound on a drum or reel). For instance, a reel of cable guide tubing is rotated while gas flow is effected from the duct's inlet to its outlet, thereby facilitating the introduction of cable into the duct. Typically, the reel is rotated without subjecting the cable guide tubing to substantial vertical oscillations (i.e., the reel maintains its vertical position during its rotation).

In an exemplary embodiment, the method includes rotating a reel of cable guide tubing at least a full turn and, using compressed (i.e., pressurized) gas, simultaneously feeding a plurality of microducts into the cable guide tubing. This has been found to solve the problems presented when microducts of varying lengths are inserted into duct.

As noted, the present invention further relates to an apparatus for inserting (or otherwise installing) cable into cable guide tubing of the kind referred to as "duct." The apparatus includes a cable injection unit provided with a hollow, substantially rectilinear cable lead-through channel. This cable lead-through channel, which extends through the cable injection unit, has an entry end and an exit end, respectively, for leading in and leading out a cable to be installed into the duct. The cable injection unit is further provided with a gas channel that opens into the cable lead-through channel so that compressed gas can be supplied to the cable lead-through channel.

The foregoing, as well as other characteristics and advantages of the present invention, and the manner in which the same are accomplished, are further specified within the following detailed description and its accompanying drawing.

BRIEF DESCRIPTION OF THE DRAWING

FIG. 1 depicts an exemplary apparatus according to the present invention for installing several microducts into cable guide tubing (i.e., wound duct on a reel).

DETAILED DESCRIPTION

In one aspect, the present invention embraces an improved method for installing cable into duct (i.e., cable guide tubing) that rotates as the cable is introduced into the duct.

As used herein and by way of example, the term "cable" may be understood to embrace cable-like elements, such as one or more longitudinally extending elements, whether free or bundled. Such cable-like elements may include tubes (e.g., a plurality of so-called microducts) in which optical glass fiber cables (e.g., so-called microduct cables) can be installed. In particular, the term "cable" may refer to a number of individual cable units (e.g., tubes), one or more of which may contain optical waveguides (e.g., optical glass fibers). In this regard, a plurality of optical waveguides may be wound around a central strengthening element.

The present inventors have found that the rotation of the duct facilitates the insertion of the cable, which may include a plurality of individual cable units (e.g., microducts), in a way that ensures that the individual cable units have substantially the same length as installed in the duct. As noted, cable units having substantially the same length are less susceptible to unwanted tensions in the duct. This, in turn, reduces, if not eliminates, the occurrence of buckled cables (e.g., longer microducts that are excessively confined within the duct) and unwanted protrusions when the duct has been opened (e.g., to make connections).

Although the present disclosure discusses rotation of the duct with respect to the cable, it should furthermore be understood that it is also possible to rotate the cable with respect to the duct. As a result of such rotation, the cable generally will be accommodated within the duct in a helical or SZ-spiral configuration.

In one embodiment, the duct rotates with respect to the cable while the cable is introduced into the duct's inlet (i.e., at a free end of the duct). In other words, the duct's axis of rotation extends more or less parallel to the direction in which the cable is introduced into the inlet end of the duct.

In such an embodiment, the cables to be guided into the duct will be subjected to substantially identical frictional forces from the inner wall of the duct. As a result, each of the cables will be installed in the duct in substantially the same length.

Typically, the duct is present on a reel so that the duct, after its manufacture, can be provided with the cables, thus obtaining a so-called "prefab" product (i.e., cables are inserted into a duct that is spirally wound on a reel). When the duct is present on the reel, the reel is rotated about its central axis thereof, and the other elements of the apparatus may be largely aligned along the reel's rotational axis.

Moreover, the rotation may be carried out in such a manner that the direction of rotation alternates. In other words, during the installation of the cable into the wound cable guide tubing, the reel rotates in the clockwise direction for a certain period, and then in the counterclockwise direction (i.e., the rotation is periodically reversed). It is also possible, however, to maintain the same direction of rotation during the entire process of inserting the cable into the cable guide tubing.

Unlike prior methods, the rotation employed in the present invention is at least a full rotation (i.e., 360° or more). This rotation may take place continuously (i.e., the duct is rotated continuously during the insertion of the cable into the cable guide tubing). As noted, the duct rotation can be carried out alternately clockwise and counterclockwise direction in full rotations, such as multiples of 360°, such as completing one or two full rotations before reversing. Those having ordinary skill in the art will appreciate that partial directional rotations of 360° or more (e.g., 450°, 540°, 630°, 810°, 900°, etc.) are within the scope of the present invention.

To realize the desired length of the cables in the cable guide tubing, the rotational speed corresponds to the speed at which the cable is being introduced into the duct. In this regard, at its inlet, the duct's axis of rotation extends more or less parallel to the direction in which the cable is introduced.

To obtain a constant and controlled introduction of the cable into the duct, suitable pressure forces are usually exerted on the cable to guide the cable in the direction of the duct. Such pressure forces are typically exerted by a set of wheels, which help to move the cable through the cable lead-through channel (i.e., toward the duct inlet). The speed at which the cable is introduced into the duct is influenced, of course, by the speed at which the wheels are driven.

In another aspect, the present invention embraces a device (depicted in FIG. 1) in which the exit end of the cable lead-through channel 8 is connected to an inlet portion of a rotation coupling unit 11 and the outlet portion of the rotation coupling unit is connected to the free end 4 of the duct 2, which is rotatable about an axis with respect to the cable 1.

In one embodiment of the present device, the duct 2 is rotatable with respect to the cable. In other words, the duct's axis of rotation extends more or less parallel to the direction in which the cable 1 is introduced into the inlet end 4 of the duct 2.

A set of wheels 7 can be mounted adjacent to the cable injection unit 6, opposite the reel 3, to help convey the cable 1, which is present there between and in contact therewith, through the cable lead-through channel 8.

To be able to carry out the rotation effectively, a conduit 10 is typically present between the exit end of the cable lead-through channel 8 and the inlet portion of the rotation coupling unit 11. The rotation coupling unit 11 is designed not only to couple the static conduit 10 to the rotating duct 2 (i.e., the free end 4 of the duct 2) but also to withstand substantial pressures from the compressed gas (e.g., pressurized to several atmospheres).

The duct 2 is typically present on a reel 3, which is rotatable about its central axis 12. As depicted in FIG. 1, the reel 3 is positioned so that its central axis 12 is substantially horizontal. In practice, the free end 4 of the duct 2, the rotation coupling unit 11, the conduit 10, the cable injection unit 6 (including the lead-through channel 8), and the wheels 7 are typically aligned with the central axis 12 about which the reel 3 rotates. To achieve this, the free end 4 of the duct 2 may be bent or otherwise positioned in alignment with the rotational axis of the reel 3. It is possible, however, for the free end 4 of the duct 2 (and the other elements of the apparatus, such as the rotation coupling unit 11) to be disposed at an angle (or otherwise offset) relative to the central axis 12 of the reel 3. Unlike prior methods, the reel 3 need not be subjected to vertical oscillations to achieve effective installation (e.g., substantially complete installation) of the cable 1 into the duct 2.

In this embodiment, the duct 2 is typically connected to the reel 3 at the circumferential end of the reel 3 (i.e., the so-called flange) via clamp 5, for example, on the flange. The clamp 5 ensures that the duct 2 is fixed in position with respect to the reel 3, which, in turn, ensures that the duct 2 is not undesirably unwound from or tightened on the reel 3 during rotation of the reel 3 and duct 2.

In another embodiment, the relative rotation is achieved by having the set of wheels 7 carry out a rotational movement so that the cable is led into the duct while being rotated. In such an embodiment, therefore, there is no need to rotate the duct 3 that is present on the reel 3.

The present inventors have performed a number of experiments, which are summarized as follows:

EXAMPLE 1

Comparative

Seven microducts each having an external diameter of 7 millimeters (i.e., describing a "cable" as discussed herein) were simultaneously introduced into a duct having an internal diameter of 23 millimeters via a blowing method using equipment as disclosed in European Patent No. EP 0,292,037 (and its counterpart U.S. Pat. No. 4,934,662). The length of the duct was 500 meters. The cable (i.e., the seven microducts) did not reach the end of the duct; the cable was blown into the duct over a distance of only 16 meters.

EXAMPLE 2

Comparative

A cable consisting of four microducts each having an external diameter of 12 millimeters was introduced into a duct having an internal diameter of 33 millimeters via a blowing method. The length to be installed was 950 meters using equipment as disclosed in European Patent No. EP 0,292,037 (and its counterpart U.S. Pat. No. 4,934,662). The installation length that could be achieved was acceptable, but the operation was frequently found to be difficult. The required compressed air pressure was too high, introducing considerable risk of microduct implosion. In general, using high pushing pressure such as that required here can cause microduct damage.

EXAMPLE 3

Comparative

Using the method described in Examples 1 and 2, four sub-bundles of (i) six microducts each having an external diameter of 4 millimeters and (ii) being wound around a central stiffening element having a diameter of 4.2 millimeters were introduced into a duct having an internal diameter of 33 millimeters. A length of 950 millimeters was achieved, but the same problems described in Example 2 were encountered. Moreover, the field installation resulted in different lengths of the six sub-bundles within the duct. As noted, this leads to protrusion problems (e.g., buckling of the microduct sub-bundles) when the duct is opened to facilitate connection operations.

EXAMPLE 4

An exemplary device according to the present invention (and as depicted in FIG. 1) was used to introduce microducts (i.e., a cable 1) into cable guide tubing (i.e., a duct 2). The microducts 1, with or without a central strengthening element, were introduced into the duct 2 wound on a reel 3. The duct 2 was fixed to a circumferential end of the reel 3 (i.e., its flange) via a clamp 5. The bundle of microducts 1 was fed by a set of driven wheels 7 to a cable injection unit 6. The cable injection unit 6 included a hollow lead-through channel 8 and an inlet 9 for introducing compressed air. The exit end of the cable injection unit 6 was connected to a rotation coupling unit 11 via a conduit 10. The outlet end of the rotation coupling unit was connected to a free end 4 of the duct 2.

According to the present invention, it was possible to introduce the individual microducts 1, with or without a central strengthening element, in substantially identical lengths into the full length of the duct 2 present on the reel 3. This was achieved by rotating the reel 3 about its central axis 12 (e.g., as indicated by the arrow shown in FIG. 1) during the installation of the microducts 1. Cable installation was further facilitated by, among other things, the application of compressed air at the gas inlet 9 and the use of the rotation coupling unit 11. In this way, the problems described in Examples 1, 2 and 3 were solved.

In particular, the reel rotation (and thus the duct rotation, too) was carried out to complete at least a full rotation (i.e., at least 360°). Thus, the reel was continuously rotated in one direction for at least a full turn. In this regard, the rotation may include periodic reversals (i.e., changing from clockwise to counterclockwise, and vice-versa).

Of particular importance, it has been unexpectedly found that, for example, rotations of 360° (e.g., alternating rotations) cause the microducts 1, which are inserted into the duct 2, to achieve a lasting, SZ-spiral configuration.

Although it is indicated in this embodiment that the reel 3 (and duct 2) is rotated with respect to the static cable injection unit 6, the set of wheels 7, the conduit 10, and the rotation coupling unit 3, it should be understood that it is also possible to make the aforesaid cable injection unit 6, set of wheels 7, conduit 10 and rotation coupling unit 11 rotatable with respect to a static (in such an embodiment) reel 3. Moreover, in another embodiment, it is possible to rotate the set of wheels 7 around the bundle of microducts 1 (i.e., the cable) while the other parts of the apparatus (including the reel 3) are not rotated. In this way, during installation, the microducts 1 will rotate with respect to the duct 2.

In the specification and FIGURE, typical embodiments of the invention have been disclosed. The present invention is not limited to such exemplary embodiments. Unless otherwise noted, specific terms have been used in a generic and descriptive sense and not for purposes of limitation.

The invention claimed is:

1. A method for installing a cable into a duct, comprising:
   inserting a cable into a free end of a duct, the duct being wound on a reel;
   simultaneously directing a flow of pressurized gas into the free end of the duct to facilitate the installation of the cable into the duct along most of the duct's length; and
   simultaneously rotating the reel about its central axis for at least a full rotation in a way that maintains the reel in a substantially steady vertical position.

2. A method according to claim 1, wherein the step of inserting a cable into a free end of a duct comprises initially inserting the cable into the duct in a direction that is in substantial alignment with the reel's central axis.

3. A method according to claim 1, wherein the step of rotating the reel about its central axis for at least a full rotation comprises alternately rotating the reel about its central axis for at least a full rotation in a first rotational direction and then rotating the reel about its central axis for at least a full rotation in a second rotational direction.

4. A method according to claim 1, wherein the step of rotating the reel about its central axis for at least a full rotation comprises effecting the full rotation of the free end of the duct at the point of cable insertion.

5. A method for installing a plurality of microducts into cable guide tubing, comprising:
   (i) providing a reel of wound duct, the duct having an available free end for the installation of one or more microducts;
   (ii) inserting a plurality of microducts into the free end of the duct;
   (iii) directing a flow of gas into the free end of the duct to facilitate the insertion of the plurality of microducts into the duct; and
   (iv) rotating the reel about its central axis for at least a full rotation, thereby effecting the full rotation of the free end of the duct at the point of microduct insertion;
   wherein steps (ii), (iii), and (iv) are performed concurrently.

6. A method according to claim 5, wherein the step of inserting a plurality of microducts into the free end of the duct comprises initially inserting the plurality of microducts into the free end of the duct in a direction that is substantially aligned with the rotational axis of the reel.

7. A method according to claim 5, wherein, during the step of rotating the reel about its central axis, the reel maintains a substantially fixed vertical position.

8. A method according to claim 5, wherein the step of rotating the reel about its central axis for at least a turn full rotation comprises alternately rotating the reel about its central axis for at least 360° in a first rotational direction and then at least 360° in a second rotational direction.

9. A method according to claim 5, wherein the step of rotating the reel about its central axis for at least a full rotation comprises alternately rotating the reel about its central axis for at least 720° in a first rotational direction and then at least 720° in a second rotational direction.

* * * * *